United States Patent

[19] Sumi

[11] Patent Number: 6,159,595
[45] Date of Patent: Dec. 12, 2000

[54] RELEASE FILM

[75] Inventor: Hiroyuki Sumi, Sagamihara, Japan

[73] Assignee: Teijin Limited, Osaka, Japan

[21] Appl. No.: 09/214,789

[22] PCT Filed: May 11, 1998

[86] PCT No.: PCT/JP98/02068

§ 371 Date: Jan. 12, 1999

§ 102(e) Date: Jan. 12, 1999

[87] PCT Pub. No.: WO98/51490

PCT Pub. Date: Nov. 19, 1998

[30] Foreign Application Priority Data

May 13, 1997 [JP] Japan ................................. 9-122028

[51] Int. Cl.$^7$ ............................ B32B 27/30; B32B 27/36
[52] U.S. Cl. ........................ 428/336; 428/451; 428/910
[58] Field of Search .................. 428/41.3, 41.4, 428/41.8, 336, 352, 451, 910

[56] References Cited

U.S. PATENT DOCUMENTS 4,426,469  1/1984  Marzola et al. .................. 523/209
5,932,352  8/1999  Higgins ........................... 428/423.1

FOREIGN PATENT DOCUMENTS 7-242829  9/1995  Japan .
8-48004   2/1996  Japan .
8-197687  8/1996  Japan .
8-197688  8/1996  Japan .

*Primary Examiner*—D. S. Nakarani
*Attorney, Agent, or Firm*—Sughrue, Mion, Zinn, Macpeak & Seas, PLLC

[57] ABSTRACT

A release film comprising a release layer provided on at least one side of a biaxially oriented polyethylene-2,6-naphthalenedicarboxylate film, wherein:

(1) the release layer is a layer formed of a resin composition consisting substantially of an acrylic resin, a silicone resin and a melamine crosslinking agent, the amount of the silicone resin being 1 to 100 parts by weight based on 100 parts by weight of the total amount of the acrylic resin and the melamine crosslinking agent, and (2) the release film has a percentage change in dimension in absolute value of 0.3% or less in both a longitudinal direction and a direction perpendicular thereto as measured at 120° C. under a stress of 150 gf/mm$^2$.

The release film is useful as a protective film for formation of a coating from a coating solution containing a variety of solvents or as a carrier film for formation of a sheet or a film, and has very small percentage change in dimension at the time of heat treatment, in particular.

5 Claims, No Drawings

RELEASE FILM

TECHNICAL FIELD

The present invention relates to a release film. More particularly, the present invention relates to a release film which is useful as a protective film for an adhesive coating formed using a coating solution or as a carrier film for formation of a resin sheet, a resin coating, a ceramic sheet or the like from a solution or a slurry and which undergoes very small dimensional change during the heat treatment conducted at the time of applying a coating solution, a resin or the like.

BACKGROUND ART

A release film is widely used as a protective film for a variety of adhesive coatings. An adhesive coating is generally formed by coating a coating solution comprising an adhesive and a solvent, on a base film and heating the coated base film to remove the solvent. A release film is laminated on a surface of the thus-formed adhesive coating and serves as a protective film.

A release film is also used as a carrier film for formation of a resin sheet, a resin coating, a ceramic sheet or the like. For example, a resin sheet is formed by coating a resin solution, obtained by dissolving a vinyl chloride resin or the like in a solvent, on a release film (carrier film) and heating the coated carrier film to remove the solvent. The thus-formed resin sheet is separated by peeling from the carrier sheet, and used, for example, as a vinyl chloride sheet for a marking sheet. A resin coating is formed by coating a coating solution comprising a solvent and a resin such as an adhesive and the like, on a carrier film and heating the coated carrier film to remove the solvent. A ceramic sheet is formed as a ceramic green sheet by coating a slurry, obtained by dispersing a ceramic powder, a binder, etc. in a solvent, on a carrier film and heating the coated carrier film to remove the solvent.

An organic solvent has been conventionally used as the above solvent. Recently, however, water is used more often than the organic solvent. That is, an aqueous adhesive solution such as emulsion has started to be used in the coating solution containing an adhesive, and a water-dispersed slurry has started to be used to coat the above slurry. The reason is that the use of water makes it very easy to handle the coating solution in the steps of adjusting the concentration of the aqueous adhesive solution or slurry, coating the same, and heating the same to remove a solvent because water, unlike an organic solvent, is free from the risk of fire or environmental pollution.

Water, however, has a larger surface tension (($\gamma L$) of about 73 dyne/cm) than an organic solvent. Therefore, when an aqueous coating solution such as an aqueous adhesive solution or a water-dispersed slurry is coated on a release layer having a small surface energy (for example, a silicone-based release layer has a surface tension ($\gamma S$) of about 19 to 21 dyne/cm), the coating solution is scattered in droplets on the surface of the release film (this may be referred to as "cissing" hereinafter), and no uniform film can be obtained, which is a serious problem.

To alleviate the problem, it is conceivable to use a coating solution (resin solution or slurry) having a higher viscosity or to add a surfactant or the like to the coating solution in order to reduce the surface tension of the coating solution. However, these measures have the following problems; that is, if the coating solution (resin solution or slurry) having a higher viscosity is used, it is difficult not only to level the surface, namely, to make the thickness of the coating solution uniform at the time of coating, but also to reduce the thickness of a resin sheet, a resin coating, a ceramic sheet or the like. On the other hand, if a surfactant is added to the coating solution, the resulting sheet may have a reduced sheet strength depending on the kind and amount of the surfactant used, whereby products having stable quality cannot be obtained.

As for reducing the thickness of a resin sheet, a resin coating, a ceramic sheet or the like, when an organic resin such as acrylic resin or alkyd resin or an organic resin-modified silicone such as alkyd resin-containing silicone resin is coated on the release layer to improve the wettability of the coating solution used for the resin sheet, the resin coating, the ceramic sheet or the like, the releasability of the release layer may be impaired, depending on the kind of the coating solution, by interaction between the resin component of the coating solution and the release layer, with the result of the breakage of sheet at the time of peeling, for example.

Meanwhile, when the release film is used as a carrier film to form a sheet or coating, a stretched film of an olefin-based resin such as polyethylene or polypropylene or a polyester-based resin such as polyethylene terephthalate is frequently used as its base film. However, since such a base film is heated at a temperature close to or higher than the glass transition temperature of the film after coated with a resin solution or a slurry, it gives rise to heat distortion caused by load such as dimensional change, wrinkle or the like, whereby the uniformity in thickness of the formed resin coating or ceramic sheet, the flatness of the surface thereof and the like are deteriorated with the result that its-properties are impaired. Moreover, when the speed of production line is increased to improve productivity, it is necessary to employ a higher heating temperature so that the solvent can be removed quickly. In this case, the above-mentioned problem is more conspicuous; therefore, an improvement therefor is desired.

A release film obtained by laminating a release layer on a polyalkylene-2,6-naphthalate film used as a carrier film is proposed in JP-A No. 8-48004. The release layer of the release film is formed of a silicone resin, a fluorine resin or a wax. When a resin coating or a resin sheet is formed on the release film described in the above publication using a solution containing a solvent such as water or slurry, there occurs a phenomenon that the solution or slurry is scattered on the release film in the form of droplets. Therefore, the release film is not suitable for obtaining an uniform coating or sheet.

Problem to be solved by the Invention

It is an object of the present invention to provide a release film which eliminates the above-mentioned defects of the prior art, which has a release layer whose surface has no cissing (has good wettability) even when an aqueous coating solution is coated thereon, which is peelable (has good releasability) with a moderate strength from a variety of adhesive coatings, resin sheets, ceramic sheets and the like, and which undergoes very small dimensional change caused by load under heating when used as a carrier film.

Means for solving the Problem

According to the studies conducted by the present inventor, it has been found that the object of the present. invention can be attained by a release film comprising a release layer provided on at least one side of a biaxially oriented polyethylene-2,6-naphthalenedicarboxylate film, wherein:

(1) the release layer is a layer formed of a resin composition consisting substantially of an acrylic resin, a silicone resin and a melamine crosslinking agent, the amount of the silicone resin being 1 to 100 parts by weight based on 100 parts by weight of the total amount of the acrylic resin and the melamine crosslinking agent, and (2) the release film has a percentage change in dimension in absolute value of 0.3% or less in both a longitudinal direction and a direction perpendicular thereto as measured at 120° C. under a stress of 150 gf/mm$^2$.

In the present invention, the "percentage change in dimension in absolute value" of a release film, as described in the measurement method thereof that will be described later, is a percentage change in dimension in absolute value which is determined by elevating the temperature of a rectangular sample cut out of the release film from a room temperature at a rate of 5° C./min while a given stress is applied to the sample in the longitudinal direction (longitudinal direction of the release film), and measuring the dimensional change of the sample when the temperature thereof has reached a given temperature. The percentage change in dimension in absolute value is determined in each of the longitudinal direction and the perpendicular direction (width direction of the release film).

The release film of the present invention will be described in more detail hereinafter.

In the present invention, a biaxially oriented polyethylene-2,6-naphthalenedicarboxylate film is used as a base film. The polyethylene-2,6-naphthalenedicarboxylate (may be referred to as "PEN polymer" hereinafter) constituting the film is a polyester containing ethylene-2,6-naphthalenedicarboxylate as a main recurring unit. This PEN polymer may be a homopolymer, or a copolymer containing a copolymer component in such a small amount (for example, 10 mole % or less, particularly 5 mole % or less based on the total dicarboxylic acid component) that the heat distortion resistance of the film is not impaired.

Illustrative examples of the above copolymer component preferably include aromatic dicarboxylic acids such as terephthalic acid, isophthalic acid, phthalic acid, naphthalene-2,7-dicarboxylic acid, 4,4'-diphenyldicarboxylic acid, 4,4'-diphenyl ether dicarboxylic acid and the like; aliphatic dicarboxylic acids such as succinic acid, adipic acid and the like; oxycarboxylic acids such as p-oxybenzoic acid, p-oxyethoxybenzoic acid and the like; and glycols such as diethylene glycol, 1,2-propylene glycol, 1,3-propylene glycol, 1,4-tetramethylene glycol, 1,6-hexamethylene glycol, neopentyl glycol and the like.

The PEN polymer may also be a copolymer copolymerized with a very small amount (such an amount that a substantially linear polymer can be obtained) of a component having at least 3 functional groups such as glycerin, pentaerythritol, trimellitic acid, pyromellitic acid or the like.

Further, the terminal hydroxyl groups and/or carboxyl groups of the PEN polymer may be partially or wholly blocked with a monofunctional compound such as benzoic acid, methoxypolyalkylene glycol or the like in order to improve its resistance to hydrolysis.

To obtain a base film excellent in mechanical properties such as Young's modulus and thermal properties such as heat distortion resistance, the PEN polymer used in the present invention is preferably a homopolymer having an intrinsic viscosity of 0.4 or more, preferably 0.5 to 0.7, and consisting essentially of ethylene-2,6-naphthalenedicarboxylate as a recurring unit.

Such a PEN polymer can be produced by a process known per se. For example, it can be produced by polycondensing naphthalene-2,6-dicarboxylic acid or an ester-forming derivative thereof (e.g. a lower alkyl ester) and ethylene glycol or an ester-forming derivative thereof in the presence of a catalyst. A PEN copolymer can be produced by adding a copolymer component to the above polymer components and subjecting the mixture to polycondensation or by mixing a polyester containing a copolymer component with a PEN polymer in a molten state and subjecting the mixture to an ester interchange reaction.

To obtain a film having good slipperiness, the PEN polymer preferably contains inorganic or organic fine particles having an average particle diameter of 0.01 to 20 µm in an amount of, for example, 0.005 to 2% by weight. Specific examples of the fine particles preferably include inorganic fine particles of silica, alumina, kaolin, calcium carbonate, titanium oxide, barium sulfate, carbon black or the like; and organic fine particles of crosslinked acrylic resin, crosslinked polystyrene resin, melamine resin, crosslinked silicone resin or the like.

In addition to the above fine particles, additives such as stabilizer, ultraviolet absorber, flame retardant, antistatic agent and the like can also be added to the PEN polymer depending upon the purpose thereof. Other thermoplastic resin may also be blended in a small amount (for example, 20% by weight or less, particularly 10% by weight or less).

The biaxially oriented PEN film used in the present invention can be produced by a conventional method known per se such as successive biaxial stretching, simultaneous biaxial stretching or the like. For example, in the case of successive biaxial stretching, the biaxially oriented PEN film can be produced by melt-extruding a sufficiently dried PEN polymer to obtain an unstretched film, stretching the unstretched film to 2 to 6 times in a longitudinal direction at a temperature of 130 to 150° C., stretching the longitudinally stretched film to 2 to 6 times in a transverse direction at a temperature of 120 to 150° C. and heat-setting the biaxially stretched film at 220 to 255° C. for 5 seconds to 1 minute. The heat-setting may be conducted under restricted shrinkage. It is preferred that electrostatic adhesion method is employed in the above melt extrusion.

To obtain a biaxially oriented PEN film having good isotropy, the above stretching ratios in the longitudinal and transverse directions are preferably nearly the same.

To further improve the heat distortion resistance (dimensional stability) around 110° C. of the release film, it is particularly preferred to subject the heat-set biaxially oriented PEN film to a thermal relaxation treatment under a tension of 4 to 20 kgf/cm$^2$ at a temperature of 100 to 150° C. for 10 seconds to 2 minutes to relax the internal stress of the film, before the formation of the release layer.

The biaxially oriented PEN film used in the present invention has no particular restriction as to the thickness, but the thickness is preferably 25 to 100 µm.

In the present invention, a release layer formed mainly of a resin composition, obtained by mixing a resin mixture comprising an acrylic resin and a melamine crosslinking agent with a silicone resin, is formed on at least one side of the biaxially oriented PEN film.

Of the resin compositions used in the present invention, at least part of the acrylic resin forms a copolymer with the silicone resin when they are blended. The melamine crosslinking agent gives rise to a crosslinking reaction mainly with the acrylic resin to form a cured release layer.

In the resin composition used in the present invention, it is possible that the silicone resin is added, for example, during or after the production of the acrylic resin to graft-polymerize the acrylic resin with the silicone resin.

The acrylic resin is added for the purpose of providing the good surface wettability to the release film, enhancing the toughness thereof and obtaining appropriate releasability. Illustrative examples of the acrylic resin include acrylic acids such as polyacrylic acid, polymethacrylic acid and the like; and acrylic acid esters such as polymethyl methacrylate, polyethyl methacrylate, higher alkyl methacrylate, derivative thereof obtained by subjecting part of the higher alkyl methacrylate to hydroxylation, or the like.

Illustrative examples of the melamine crosslinking agent include methylated melamine, butylated melamine and methylated urea melamine. The mixing ratio of the melamine crosslinking agent to the acrylic resin is preferably 5 to 200 parts by weight based on 100 parts by weight of the acrylic resin. As a catalyst for the crosslinking reaction between the melamine crosslinking agent and the acrylic resin, an acid catalyst such as paratoluenesulfonic acid soda or the like can be used, for example.

The silicone resin is a polymer whose basic skeleton is composed of a polydimethylsiloxane. It preferably has a phenyl group, alkyl group or the like at the terminal or the side chain to improve the compatibility with the acrylic resin or the like. Specific examples of such a silicone resin include a polyphenylpolysiloxane and a hydroxyl group-substituted diphenylpolysiloxane. The proportion of the silicone resin is preferably 1 to 50 parts by weight, particularly preferably 5 to 10 parts by weight, based on 100 parts by weight of the total of the acrylic resin and the melamine crosslinking agent.

In the present invention, a release film formed of the above-mentioned resin composition is formed on at least one side of the biaxially oriented PEN film. This release layer can be formed, for example, by coating a coating solution, which contains the components constituting the release layer, on the PEN film and heating the coated PEN film to dryness to cure so as to form a coating film on the PEN film. The method for coating the coating solution can be any known coating method. There can be mentioned, for example, a roll coating, blade coating, bar coating or the like. The conditions for heating to dryness are preferably 80 to 160° C. for 10 to 120 seconds, particularly preferably 120 to 150° C. for 20 to 60 seconds. The thickness of the release layer after the coating solution is dried is preferably 0.02 to 50 $\mu$m, more preferably 0.05 to 10 $\mu$m, particularly preferably 0.1 to 1 $\mu$m.

In the present invention, it is preferred to form a primer layer between the biaxially oriented PEN film and the release layer so that the adhesion therebetween can be enhanced. The primer layer is preferably a silane coupling agent, for example. The silane coupling agent may be a compound represented by the general formula Y—Si—X$_3$. In the general formula, Y is a functional group exemplified by an amino group, epoxy group, vinyl group, methacryl group, mercapto group or the like, and X is a hydrolyzable functional group exemplified by an alkoxy group. The thickness of the above primer layer is preferably 0.01 to 5 $\mu$m, particularly preferably 0.02 to 2 $\mu$m. When the thickness of the primer layer is within the above range, the adhesion between the biaxially oriented PEN film and the release layer is good and, further, the biaxially oriented PEN film having the primer layer thereon hardly causes blocking. Therefore, it is advantageous that there is almost no problem in handling of the film.

The release film according to the present invention is extremely excellent in heat distortion resistance (percentage change in dimension). That is, it has a percentage change in dimension in absolute value of 0.3% or less, preferably 0.2% or less, in both a longitudinal direction and a direction perpendicular thereto as measured at 120° C. under a stress of 150 gf/mm$^2$. The most preferred percentage change in dimension is 0.1% or less.

EXAMPLES

The following examples are given to further illustrate the present invention. The following properties of a film were observed and measured by the following methods.

(1) Wettability of aqueous coating solution

| Composition of ceramic powder-dispersed slurry | |
|---|---|
| a. Ceramic powder (barium titanate) | 100 parts by weight |
| b. Water-soluble acrylic emulsion | 25~30 parts by weight |
| c. Water-soluble polyurethane resin | 2 parts by weight |
| d. Ammonium polycarboxylate | 1 part by weight |
| e. Water | 10~20 parts by weight |
| f. Ammonia | 1 part by weight |

The above components were mixed using a ball mill to obtain a ceramic powder-dispersed slurry having a particle size of 7 or more as measured by a Hegman grind gage. Thereafter, the ceramic powder-dispersed slurry was coated on the release layer surface of a release film using a straight edge applicator having a gap of 1 mil., dried at 110° C. for 2 minutes, and the state of cissing at the edge portions of the film was examined visually to evaluate the wettability of the aqueous coating solution according to the following criteria.

A: No cissing is observed (good wettability).

B: Slight cissing is observed (moderately good wettability).

C: Distinct cissing is observed (poor wettability).

(2) Peelability of ceramic sheet

The ceramic sheet formed by the method of the above (1) was peeled from the release film to examine and evaluate the peelability according to the following criteria.

A: The ceramic sheet can be easily peeled (good peelability).

B: Due to high peeling strength, the ceramic sheet breaks when pulled abruptly (moderately good peelability).

C: The ceramic sheet breaks (poor peelability).

D: Due to cissing, it is impossible to form a ceramic sheet.

(3) Residual adhesivity percentage

A polyester adhesive tape (Nitto 31B) was adhered to a cold-rolled stainless steel plate (SUS 304) specified by JIS G 4305, and peeled to measure the peeling strength. This peeling strength was taken as the basic adhesivity ($f_0$) of the tape. Next, another fresh polyester adhesive tape was adhered to the release layer surface of a release film using a 2-kg pressure roller, left to stand for 30 seconds and peeled. The peeled adhesive tape was adhered onto the above stainless steel plate and peeled to measure the peeling strength. This peeling strength was taken as the residual adhesivity (f) of the tape. The residual adhesivity percentage of the release film was calculated from the following formula using the basic adhesivity ($f_0$) and the residual adhesivity (f).

$$\text{residual adhesivity percentage } (\%) = (f/f_0) \times 100$$

The residual adhesivity percentage is preferably 85% or more. A residual adhesivity of less than 85% is not preferred because when a release film having such a residual adhesivity percentage is wound into a roll and stored, the component constituting the release layer of the film is transferred on the adjacent surface of the film (back transferring), whereby the properties such as wettability, peelability and the like of the release layer are deteriorated.

(4) Heat distortion resistance (percentage change in dimension)

A rectangular release film cut to a size of 30 mm or more in measurement direction and 4 mm in width was fitted to the jig of a TMA (a thermal stress-strain measuring device, TMA/SS120C, a product of Seiko Instruments Inc.) in such a manner that the distance between chucks was to be 10 mm. The release film was heated from room temperature at a temperature elevation rate of 5° C./min under a stress of 150 gf/mm². The dimensional changes in the longitudinal and perpendicular directions of the release film when the temperature reached 120° C. were measured, and the percentage change in dimension (%) of the release film was calculated from the following formula.

Percentage change in dimension in absolute value (%)={(length of dimensional change)/(distance between chucks)}×100

Example 1

A PEN polymer having an intrinsic viscosity of 0.62 was melted using an extruder. The molten polymer having a film shape was extruded from a die onto a rotary cooling drum maintained at 40° C., adhered to the rotary cooling drum by an electrostatic adhesion method and quenched to obtain an unstretched film. Then, the unstretched film was stretched to 3.7 times in the longitudinal direction and to 3.8 times in the transverse direction, and heat-set at 240° C. to obtain a biaxially oriented PEN film having a thickness of 50 μm. Thereafter, the biaxially oriented PEN film was subjected to a thermal relaxation treatment at 100° C. for 20 seconds under a tension of 15 kgf/cm².

Next, a resin composition obtained by mixing 200 parts by weight of an acrylic resin (polymethyl methacrylate), 60 parts by weight of a melamine crosslinking agent (butylated melamine) and 40 parts by weight of a silicone resin (polyphenylpolysiloxane) (which corresponds to about 15 parts by weight of a silicone resin based on 100 parts by weight of a resin mixture consisting of an acrylic resin and a melamine crosslinking agent) was dissolved in a mixed solvent consisting of methyl ethyl ketone, methyl isobutyl ketone and toluene to prepare a solution having a total solid content of 3 wt %. An acid catalyst (paratoluenesulfonic acid) as a curing accelerator was further added to the solution to prepare a coating solution.

The coating solution was coated on one side of the above-obtained biaxially oriented PEN film, which had been subjected to a thermal relaxation treatment, in an amount of 8 g/m² (wet) and heated to dryness at 150° C. for 1 minute to cure the coating film. Thus, a release film having a 0.3-μm-thick release layer was obtained. The properties of the release film are shown in Table 1.

Example 2

A biaxially oriented PEN film was produced in the same manner as in Example 1 except that a thermal relaxation treatment was carried out at 120° C. for 1 minute under a tension of 8 kgf/cm².

Next, a resin composition obtained by mixing 100 parts by weight of an acrylic resin (50 parts by weight of a polymethyl methacrylate and 50 parts by weight of ethyl hydroxymethacrylate), 100 parts by weight of a melamine crosslinking agent (butylated melamine) and 40 parts by weight of a silicone resin (a hydroxyl group-substituted diphenylpolysiloxane) (which corresponds to about 20 parts by weight of a silicone resin based on 100 parts by weight of a resin mixture consisting of an acrylic resin and a melamine crosslinking agent) was dissolved in a mixed solvent consisting of methyl ethyl ketone, methyl isobutyl ketone and toluene to prepare a solution having a total solid content of 3 wt %. An acid catalyst (paratoluenesulfonic acid) as a curing accelerator was further added to the solution to prepare a coating solution.

The coating solution was coated on one side of the above-obtained biaxially oriented PEN film, which had been subjected to a thermal relaxation treatment, in an amount of 8 g/m² (wet) and heated to dryness at 150° C. for 1 minute to cure the coating film. Thus, a release film having a 0.3-μm-thick release layer was obtained. The properties of the release film are shown in Table 1.

Comparative Example 1

A polyethylene terephthalate having an intrinsic viscosity of 0.62 (may be referred to as PET hereinafter) was melted using an extruder. The molten polymer having a film shape was extruded from a die onto a rotary cooling drum maintained at 40° C., adhered to the rotary cooling drum by an electrostatic adhesion method and quenched to obtain an unstretched film. Then, the unstretched film was stretched to 3.6 times in the longitudinal direction and to 3.9 times in the transverse direction, and heat-set at 220° C. to obtain a biaxially oriented PET film having a thickness of 50 μm. Thereafter, the biaxially oriented PET film was subjected to a thermal relaxation treatment at 120° C. for 1 minute under a tension of 8 kgf/cm².

Next, a curable silicone (KS 847H, a product of Shin-Etsu Chemical Co., Ltd.), obtained through an addition reaction caused by adding a platinum catalyst to a mixed solution of polydimethylsiloxane and dimethylhydrogensilane, was dissolved in a mixed solvent consisting of methyl ethyl ketone, methyl isobutyl ketone and toluene to prepare a coating solution having a total solid content of 2 wt %. The coating solution was coated on one side of the above-obtained biaxially oriented polyethylene terephthalate film, which had been subjected to a thermal relaxation treatment, in an amount of 6 g/m² (wet) and heated to dryness at 150° C. for 1 minute to cure the coating film. Thus, a release film having a 0.15-μm-thick release layer was obtained. The properties of the release film are shown in Table 1.

Comparative Example 2

A PET polymer was melt-extruded and stretched in the same manner as in Comparative Example 1 to obtain a biaxially oriented PET film having a thickness of 50 μm. This film, however, was not subjected to a thermal relaxation treatment.

Next, a resin composition consisting of 100 parts by weight of an acrylic resin (polymethyl methacrylate) and 40 parts by weight of a melamine crosslinking agent (butylated melamine) was dissolved in a mixed solvent consisting of methyl ethyl ketone, methyl isobutyl ketone and toluene to prepare a solution having a total solid content of 3 wt %.

The coating solution was coated on one side of the above-obtained biaxially oriented PET film in an amount of 8 g/m² (wet) and heated to dryness at 150° C. for 1 minute to cure the coating film. Thus, a release film having a 0.3-μm-thick release layer was obtained. The properties of the release film are shown in Table 1.

Comparative Example 3

A PEN polymer having an intrinsic viscosity of 0.62 was melted using an extruder. The molten polymer having a film shape was extruded from a die onto a rotary cooling drum maintained at 40° C., adhered to the rotary cooling drum by an electrostatic adhesion method and quenched to obtain an unstretched film. Then, the unstretched film was stretched to 3.7 times in the longitudinal direction and to 3.8 times in the transverse direction, and heat-set at 250° C. to obtain a biaxially oriented PEN film having a thickness of 50 µm. The biaxially oriented PEN film, however, was not subjected to a thermal relaxation treatment.

Next, a resin composition obtained by mixing 200 parts by weight of an acrylic resin (polyacrylic acid), 50 parts by weight of a melamine crosslinking agent (butylated melamine) and 25 parts by weight of a silicone resin (polyphenylpolysiloxane) (which corresponds to about 10 parts by weight of a silicone resin based on 100 parts by weight of a resin mixture consisting of an acrylic resin and a melamine crosslinking agent) was dissolved in a mixed solvent consisting of methyl ethyl ketone, methyl isobutyl ketone and toluene to prepare a solution having a total solid content of 3 wt %. An acid catalyst (paratoluenesulfonic acid) as a curing accelerator was further added to the solution to prepare a coating solution.

The coating solution was coated on one side of the above-obtained biaxially oriented PEN film in an amount of 8 g/m² (wet) and heated to dryness at 150° C. for 1 minute to cure the coating film. Thus, a release film having a 0.3-µm-thick release layer was obtained. The properties of the release film are shown in Table 1.

Comparative Example 4

A resin composition obtained by mixing 100 parts by weight of an alkyd resin (a castor oil-modified alkyd resin), 200 parts by weight of an acrylic resin (100 parts by weight of a polyacrylic acid and 100 parts by weight of a polyethyl methacrylate), 100 parts by weight of a melamine crosslinking agent (butyrated melamine) and 60 parts by weight of a silicone resin (a hydroxyl group-substituted diphenylpolysiloxane) (which corresponds to 20 parts by weight based on 100 parts by weight of a resin mixture consisting of an alkyd resin, an acrylic resin and a melamine crosslinking agent) was dissolved in a mixed solvent consisting of methyl ethyl ketone, methyl isobutyl ketone and toluene to prepare a solution having a total solid content of 3 wt %. An acid catalyst (paratoluenesulfonic acid) as a curing accelerator was further added to the solution to prepare a coating solution.

A release film was produced in the same manner as in Example 1 except that the coating solution prepared above was coated on a biaxially oriented PEN film. The properties of the release film are shown in Table 1.

TABLE 1

| | property of release film heat distortion resistance (percentage change in dimension) | | properties of release layer | | |
|---|---|---|---|---|---|
| | longitudinal direction (%) | perpendicular direction (%) | wettability of aqueous coating solution | peelability of ceramic sheet | residual adhesivity percentage (%) |
| Ex.1 | 0.11 | 0.10 | A | A | 97 |
| Ex.2 | 0.06 | 0.05 | A | A | 95 |
| Comp. Ex.1 | 0.45 | 0.35 | C | D | 90 |
| Comp. Ex.2 | 0.55 | 0.40 | A | C | 96 |
| Comp. Ex.3 | 0.35 | 0.35 | A | A~B | 96 |
| Comp. Ex.4 | 0.10 | 0.09 | A | B~C | 93 |

Ex.: Example
Comp.Ex.: Comparative Example

As is clear from Table 1, the release films of Examples 1 and 2 of the present invention are excellent in heat distortion resistance; surface wettability, that is, cissing resistance to aqueous coating solution; sheet peelability; and non-transfer property of coating film.

Effects of the Invention

With the release film of the present invention using a biaxially oriented PEN film as the base film, there can be produced sheets of high dimensional accuracy, such as a resin sheet, which undergo no distortion even when the solvent is removed at high temperatures and under a high load during their production process.

Further, since the release film of the present invention uses a coating film obtained by curing a resin composition consisting of an acrylic resin, a melamine crosslinking agent and a silicone resin for its release layer, it shows an excellent wettability when an aqueous coating solution as well as an organic solvent-based coating solution is used for formation of a variety of coatings or sheets. Furthermore, the release film of the present invention, as compared with a release film having a release layer comprising an alkyd resin, has improved peelability to a variety of resin sheets, resin coatings, ceramic sheets and the like and makes it easier to reduce the thickness of a resin sheet, a resin coating, a ceramic sheet and the like. The release film of the present invention is useful as a protective film for an adhesive coating or as a carrier film for formation of a resin sheet, a resin coating, a ceramic sheet or the like.

What is claimed is:

1. A release film comprising a release layer provided on at least one side of a biaxially oriented polyethylene-2,6-naphthalenedicarboxylate film, wherein:

(1) the release layer is a layer formed of a resin composition consisting substantially of an acrylic resin, a silicone resin and a melamine crosslinking agent, the amount of the silicone resin being 1 to 100 parts by weight based on 100 parts by weight of the total amount of the acrylic resin and the melamine crosslinking agent, and (2) the release film has a percentage change in dimension in absolute value of 0.3% or less in both a longitudinal direction and a direction perpendicular thereto as measured at 120° C. under a stress of 150 gf/mm².

2. The release film of claim 1, wherein the resin composition comprises 1 to 50 parts by weight of the silicone resin based on 100 parts by weight of the total of the acrylic resin and the melamine crosslinking agent.

3. The release film of claim 1, wherein the release film has a percentage change in dimension in absolute value of 0.2% or less in both a longitudinal direction and a direction perpendicular thereto as measured at 120° C. under a stress of 150 gf/mm².

4. The release film of claim 1, wherein the resin composition contains 5 to 200 parts by weight of the melamine crosslinking agent based on 100 parts by weight of the acrylic resin.

5. The release film of claim 1, wherein the release layer has a thickness of 0.02 to 50 $\mu$m.

* * * * *